W. HALKYARD,
Assignor to T. H. BOWLES, said BOWLES assignor of nineteen one-thousandths to said HALKYARD.
PANORAMIC SIGN FOR CARS.
No. 10,445. Reissued Feb. 5, 1884.
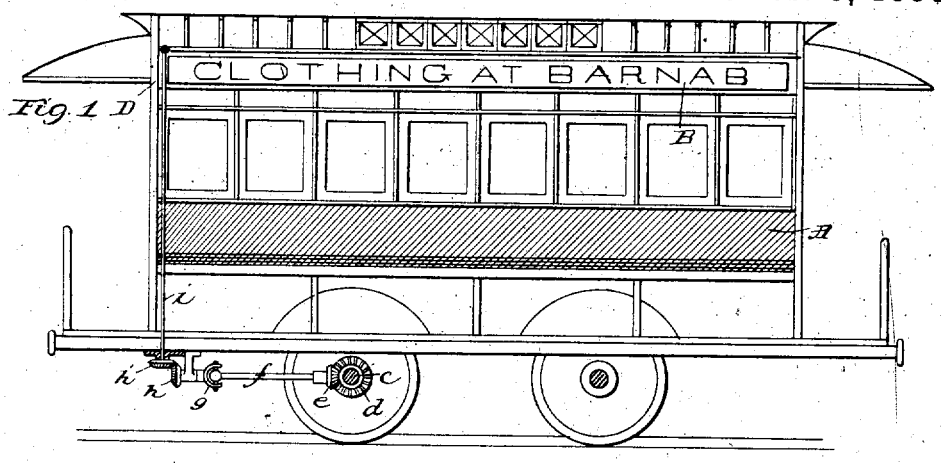
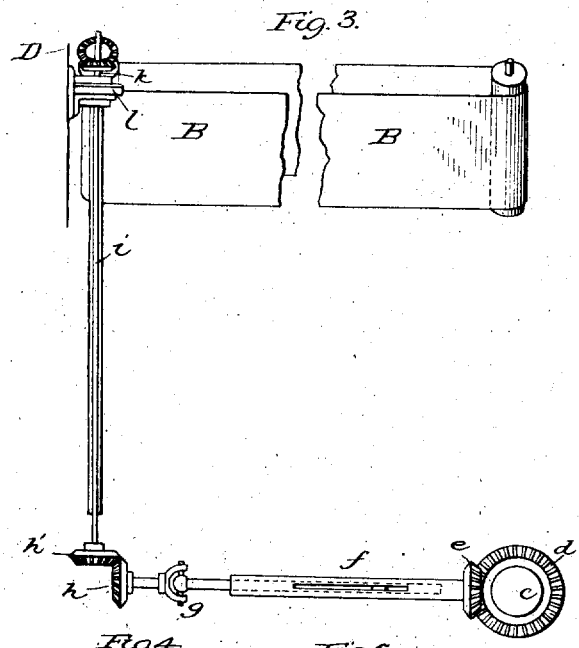
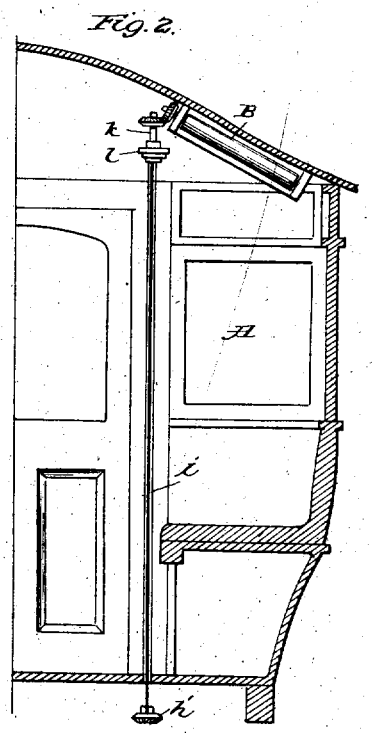
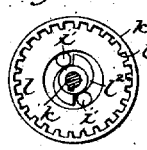
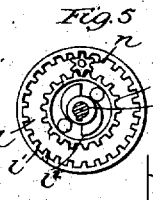
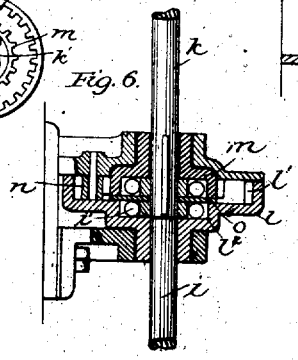
Attest:
F. L. Middleton
L. H. Joyce
Inventor
William Halkyard
by Joyce & Spear
Att'ys.

UNITED STATES PATENT OFFICE.

WILLIAM HALKYARD, OF PROVIDENCE, RHODE ISLAND, ASSIGNOR TO THOMAS H. BOWLES, OF FULTON COUNTY, GEORGIA; SAID BOWLES ASSIGNOR OF NINETEEN ONE-THOUSANDTHS TO SAID HALKYARD.

PANORAMIC SIGN FOR CARS.

SPECIFICATION forming part of Reissued Letters Patent No. 10,445, dated February 5, 1884.

Original No. 263,698, dated September 5, 1882. Application for reissue filed January 8, 1884.

*To all whom it may concern:*

Be it known that I, WILLIAM HALKYARD, of the city and county of Providence, and State of Rhode Island, have invented a new and useful Improvement in Advertising Devices for Cars; and I hereby declare that the following is a full, clear, and exact description of the same.

This invention has reference to an improvement in advertising devices for street or railway cars; and it consists of an endless apron bearing advertisements on its surface, arranged longitudinally of the car, in combination with supporting-rollers, and mechanism connecting one of these rollers with an axle of the car, whereby a continuous traveling movement is imparted to the apron from end to end of the car, while the car is in motion; and, further, in so placing an endless apron covered with advertisements in a car that the same can be driven in one direction from one of the axles of the car, irrespective of the direction in which said axle revolves, as will be more fully set forth hereinafter.

Figure 1 is a longitudinal section of horse-car provided with an advertising device driven from one of the axles of the car. Fig. 2 is a cross-section of part of a horse-car, showing the connection for driving the endless apron. Fig. 3 is an enlarged skeleton view of the gears and shafts by which motion is transmitted from the axle of the car to the endless apron. Fig. 4 is a view of the disk connected with the driving-shaft, constructed to drive the apron when the car moves in one direction; and Fig. 5 is a view of the disk provided with an idle-gear, connecting the toothed rim with an inner-gear for driving the apron in the same direction when the car moves in the opposite direction. Fig. 6 is a sectional view of the driving-clutch provided with the disks shown in Figs. 4 and 5.

In the drawings, A represents the body of the car; B, the endless apron, on which the advertisements are placed. C is one of the car-axles. This apron B is arranged longitudinally of the car upon rollers, transversely and near the end walls. One of these rollers is connected by intermediate gearing and shafts to an axle of the car, so that longitudinal traveling movement is given to the apron when the car is in motion, thus causing the advertisements on the apron to shift into view, pass over the exposed surface and out of view. The exposed surface is preferably over one seat and directly opposite the other. The devices for communicating motion to the apron are particularly described in connection with the special mechanisms referred to above.

*d* is a beveled gear secured to the axle of the car.

*e* is a pinion gearing into the gear *d*, and driving the sleeve *f*, in which a driving-rod is secured by means of a slot and feather, so as to allow of longitudinal adjustment. The other end of the driving-rod is connected with the beveled pinion *h* by a universal joint. The beveled pinion *h'* is connected with the vertical shaft *i*, and is driven by the pinion *h*.

To the upper part of the vertical shaft *i* an automatic reversible clutch is secured, constructed to drive the short shaft *k* always in one direction. Such a clutch is shown in Figs. 4, 5, and 6. It consists of the disk *l*, secured to the end of the shaft, and provided with a toothed rim, *l'*, and a recess, $l^2$, in which is seated a cam, *k'*, secured to the upper short shaft, *k*. The cam shown has two cam-surfaces adapted, upon the rotation of the disk *l* in one direction, to wedge the balls *i'* against the walls of the recess $l^2$, thus binding the shaft *k* to the disk *l*, and causing them to move together; but on revolving the disk *l* in the opposite direction, no wedging action will be exerted by the straight surfaces of the cam on the balls, so that said balls can rotate freely within the recess $l^2$, thus severing the driving-connection between the disk and shaft *k*.

Within the rimmed disk *l* the geared sleeve *m* is placed, surrounding the shaft *k*, but loose on the same, and the pinion *n*, meshing with the toothed rim *l'* and geared sleeve, is fixed in a bracket. A cam-clutch similar in all respects to that above described is placed within the sleeve *m*, which connects the short shaft *k* with the sleeve when the shaft *i* turns in a direction to break the driving-connection between the disk *l* and shaft *k*, so that no matter in which direction the car moves, the apron is impelled continuously in the direction which will bring the words or letters into view successively in the order in which they are to be read, so that continuous advertising-sentences or other information can be read, even though said sentences occupy a longer space on the apron than is at once exposed to view. The respective cams and their balls are separated from each other by a plate, *o*.

It will be seen that by the arrangement hereinbefore described, of the disk *l*, shaft *k*, and cams thereon, and the sleeve *m* and pinion *n*, an automatic reversible clutch is formed, by means of which the shaft *k* is rotated only in one direction, no matter in which direction the car-axle revolves.

It will be understood that I do not confine myself to the specific form of reversible clutch described in the foregoing specification, as other equivalent means may be used to attain the same end—to wit, to so connect the advertising-apron with the car-axle, that said apron will always be moved in one direction by the revolution of the axle, irrespective of the direction in which said axle revolves.

It will be apparent that while my invention is intended more particularly for street-cars, it is equally adapted to railway-cars, steamboats, and to other localities where driven machinery can be utilized for motive power.

I am aware of Letters Patent of the United States No. 159,881, February 16, 1875, showing a drum located on the side of the car, and diven by gearing connecting it to an axle, so as to rotate on its longitudinal axis; and I am also aware of Letters Patent of the United States No. 131,421, for station-indicators, showing a band placed across the end of the car, connected by gearing to the shaft underneath the car, said shaft having a friction-wheel adapted to strike against a special rail at the station to move the band. I do not therefore claim, broadly, the connection of the moving mechanism carrying advertisements geared to the axle of the car. Nor do I claim a horizontal band adapted to be moved intermittingly by gearing connected to a shaft underneath the car.

Having thus described my invention, what I claim as new, and desire to secure by Letters Patent, is—

1. In a car, an endless apron having advertisements on its surface, arranged longitudinally of the car upon supporting-rollers, in combination with suitable gearing positively connecting one of the rollers to one of the car-axles, whereby a continuous longitudinal movement is imparted to the apron when the car is in motion, substantially as described.

2. In combination, in a car, the endless apron B, the axle C, and means for conveying motion from the axle to the apron, and an automatic reversible clutch constructed to drive the apron in one direction only, as described.

WILLIAM HALKYARD.

Witnesses:
J. A. MILLER, Jr.,
M. F. BLIGH.